United States Patent
Jiang et al.

(10) Patent No.: US 7,058,481 B2
(45) Date of Patent: Jun. 6, 2006

(54) METHOD AND APPARATUS FOR CENTRALLY-CONTROLLED ELECTRICAL PROTECTION SYSTEM ARCHITECTURE RELIABILITY IMPROVEMENT BASED ON SENSITIVITY ANALYSIS

(75) Inventors: Mingxiao Jiang, Clifton Park, NY (US); Charles Scott Sealing, Clifton Park, NY (US); Ertugrul Berkcan, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 498 days.

(21) Appl. No.: 10/373,675

(22) Filed: Feb. 25, 2003

(65) Prior Publication Data

US 2003/0220719 A1 Nov. 27, 2003

Related U.S. Application Data (60) Provisional application No. 60/359,544, filed on Feb. 25, 2002, provisional application No. 60/438,159, filed on Jan. 6, 2003.

(51) Int. Cl.
*H02H 3/05* (2006.01)
(52) U.S. Cl. ................ 700/286; 700/79; 700/297; 714/1
(58) Field of Classification Search ............. 700/21, 700/79; 714/1; 318/568.24
See application file for complete search history.

(56) References Cited

U.S. PATENT DOCUMENTS

| | | |
|---|---|---|
| 3,772,505 A | 11/1973 | Massell |
| 3,938,007 A | 2/1976 | Boniger et al. |
| 3,956,671 A | 5/1976 | Nimmersjo |
| 3,963,964 A | 6/1976 | Mustaphi |
| 4,001,742 A | 1/1977 | Jencks et al. |
| 4,245,318 A | 1/1981 | Eckart et al. |
| 4,291,299 A | 9/1981 | Hinz et al. |
| 4,301,433 A | 11/1981 | Castonguay et al. |
| 4,311,919 A | 1/1982 | Nail |
| 4,415,968 A | 11/1983 | Maeda et al. |
| 4,423,459 A | 12/1983 | Stich et al. |
| 4,432,031 A | 2/1984 | Premerlani |
| 4,455,612 A | 6/1984 | Girgis et al. |
| 4,468,714 A | 8/1984 | Russell |

(Continued)

FOREIGN PATENT DOCUMENTS

EP 0718948 A2 6/1996

(Continued)

OTHER PUBLICATIONS

Atanackovic D. et al. An Integrated Knowledge-Based Model For Power-System Planning IEEE Expert, IEEE Inc. New York, Jul. 1997; pp. 65-71.

*Primary Examiner*—Jayprakash N. Gandhi
(74) *Attorney, Agent, or Firm*—Ohlandt, Greeley, Ruggiero & Perle, L.L.P.

(57) ABSTRACT

A method and system and a computer program for improving reliability of a centrally-controlled electrical protection system is provided. The method includes identifying at least one component of the centrally-controlled power distribution system, obtaining at least one of reliability data and reparability data for each at least one component of the centrally-controlled power distribution system, and constructing a reliability block diagram for each functional category. The computer system and computer program code segment are configured to implement the method for improving reliability of a centrally-controlled electrical protection system architecture based on sensitivity analysis.

22 Claims, 8 Drawing Sheets

U.S. PATENT DOCUMENTS

| | | |
|---|---|---|
| 4,589,074 A | 5/1986 | Thomas et al. |
| 4,623,949 A | 11/1986 | Salowe et al. |
| 4,631,625 A | 12/1986 | Alexander et al. |
| 4,642,724 A | 2/1987 | Ruta |
| 4,652,966 A | 3/1987 | Farag et al. |
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,426,674 A * | 6/1995 | Nemirovsky et al. ....... 709/241 |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,125,453 A * | 9/2000 | Wyss ........................... 714/1 |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |

| | | | | | | |
|---|---|---|---|---|---|---|
| 6,175,780 B1 | 1/2001 | Engel | | 6,553,418 B1 | 4/2003 | Collins et al. |
| 6,185,482 B1 | 2/2001 | Egolf et al. | | 2001/0010032 A1 | 7/2001 | Ehlers et al. |
| 6,185,508 B1 | 2/2001 | Van Doorn et al. | | 2001/0032025 A1 | 10/2001 | Lenz et al. |
| 6,186,842 B1 | 2/2001 | Hirschbold et al. | | 2001/0044588 A1 | 11/2001 | Mault |
| 6,195,243 B1 | 2/2001 | Spencer et al. | | 2001/0048354 A1 | 12/2001 | Douville et al. |
| 6,198,402 B1 | 3/2001 | Hasegawa et al. | | 2001/0055965 A1 | 12/2001 | Delp et al. |
| 6,212,049 B1 | 4/2001 | Spencer et al. | | 2002/0010518 A1 | 1/2002 | Reid et al. |
| 6,233,128 B1 | 5/2001 | Spencer et al. | | 2002/0032535 A1 | 3/2002 | Alexander et al. |
| 6,236,949 B1 | 5/2001 | Hart | | 2002/0034086 A1 | 3/2002 | Scoggins et al. |
| 6,242,703 B1 | 6/2001 | Castonguay et al. | | 2002/0045992 A1 | 4/2002 | Shincovich et al. |
| 6,268,991 B1 | 7/2001 | Criniti et al. | | 2002/0059401 A1 | 5/2002 | Austin |
| 6,285,917 B1 | 9/2001 | Sekiguchi et al. | | 2002/0063635 A1 | 5/2002 | Shincovich |
| 6,288,882 B1 | 9/2001 | DiSalvo et al. | | 2002/0064010 A1 | 5/2002 | Nelson et al. |
| 6,289,267 B1 | 9/2001 | Alexander et al. | | 2002/0091949 A1 | 7/2002 | Ykema |
| 6,291,911 B1 | 9/2001 | Dunk et al. | | 2002/0094799 A1 | 7/2002 | Elliott et al. |
| 6,292,340 B1 | 9/2001 | O'Regan et al. | | 2002/0107615 A1 | 8/2002 | Bjorklund |
| 6,292,717 B1 | 9/2001 | Alexander et al. | | 2002/0108065 A1 | 8/2002 | Mares |
| 6,292,901 B1 | 9/2001 | Lys et al. | | 2002/0109722 A1 | 8/2002 | Rogers et al. |
| 6,297,939 B1 | 10/2001 | Bilac et al. | | 2002/0111980 A1 | 8/2002 | Miller et al. |
| 6,313,975 B1 | 11/2001 | Dunne et al. | | 2002/0116092 A1 | 8/2002 | Hamamatsu et al. |
| 6,321,187 B1 * | 11/2001 | Squier et al. ........... 703/18 | | 2002/0124011 A1 | 9/2002 | Baxter et al. |
| 6,341,054 B1 | 1/2002 | Walder et al. | | 2002/0146076 A1 | 10/2002 | Lee |
| 6,347,027 B1 | 2/2002 | Nelson et al. | | 2002/0146083 A1 | 10/2002 | Lee et al. |
| 6,351,823 B1 | 2/2002 | Mayer et al. | | 2002/0147503 A1 | 10/2002 | Osburn, III |
| 6,356,422 B1 | 3/2002 | Bilac et al. | | 2002/0159402 A1 | 10/2002 | Binder |
| 6,356,849 B1 | 3/2002 | Jaffe | | 2002/0162014 A1 | 10/2002 | Przydatek et al. |
| 6,369,996 B1 | 4/2002 | Bo | | 2002/0163918 A1 | 11/2002 | Cline |
| 6,377,051 B1 | 4/2002 | Tyner et al. | | 2002/0165677 A1 | 11/2002 | Lightbody et al. |
| 6,385,022 B1 | 5/2002 | Kulidjian et al. | | 2002/0181174 A1 | 12/2002 | Bilac et al. |
| 6,396,279 B1 | 5/2002 | Gruenert | | 2002/0193888 A1 | 12/2002 | Wewalaarachchi et al. |
| 6,397,155 B1 | 5/2002 | Przydatek et al. | | 2003/0043785 A1 | 3/2003 | Liu et al. |
| 6,405,104 B1 | 6/2002 | Dougherty | | | | |
| 6,406,328 B1 | 6/2002 | Attarian et al. | | | | |
| 6,411,865 B1 | 6/2002 | Qin et al. | | | | |
| 6,441,931 B1 | 8/2002 | Moskovich et al. | | | | |
| 6,459,997 B1 | 10/2002 | Anderson | | | | |
| 6,496,342 B1 | 12/2002 | Horvath et al. | | | | |
| 6,535,797 B1 | 3/2003 | Bowles et al. | | | | |
| 6,549,880 B1 | 4/2003 | Willoughby et al. | | | | |

FOREIGN PATENT DOCUMENTS

| | | |
|---|---|---|
| EP | 0723325 A1 | 7/1996 |
| EP | 0949734 A2 | 10/1999 |

* cited by examiner

METHOD AND APPARATUS FOR CENTRALLY-CONTROLLED ELECTRICAL PROTECTION SYSTEM ARCHITECTURE RELIABILITY IMPROVEMENT BASED ON SENSITIVITY ANALYSIS

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application Ser. No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for facilitating maximizing a power distribution system reliability and availability.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

BRIEF DESCRIPTION OF THE INVENTION

In one aspect, a method for improving reliability of a centrally-controlled electrical protection system architecture based on sensitivity analysis is provided. The power distribution system includes at least one component, and a protection system that includes at least one functional category. The method includes identifying at least one component of the centrally-controlled power distribution system, obtaining at least one of reliability data and reparability data for each at least one component of the centrally-controlled power distribution system, and constructing a reliability block diagram for each functional category.

In another aspect, a computer system for improving reliability of a centrally-controlled electrical protection system architecture based on sensitivity analysis is provided. The computer system is configured to determine a reliability of said centrally-controlled electrical protection system, vary at least one of a redundancy, reliability, and a reparability of said at least one component of said system, determine a change in said system reliability based on a change of said varied redundancy, reliability, and reparability of each said at least one component, identify a first component whose change in at least one of redundancy, reliability and reparability produces a change of the system reliability of a first amount, and identify a second component whose change in redundancy, reliability, and reparability produces a change of the system reliability of a second amount, wherein said first amount is greater than the second amount.

In yet another aspect, a program code segment for improving reliability of a centrally-controlled electrical protection system architecture based on sensitivity analysis is provided. The program code segment is configured to determine a reliability of said centrally-controlled electrical protection system, vary at least one of a redundancy, a reliability, and a reparability of said at least one component of said system, determine a change in said system reliability based on a change of said varied redundancy, reliability, and reparability of each said at least one component, identify a first component whose change in at least one of redundancy, reliability and reparability produces a change of the system reliability of a first amount, and identify a second component whose change in redundancy, reliability, and reparability produces a change of the system reliability of a second amount, wherein said first amount is greater than the second amount.

DETAILED DESCRIPTION OF THE INVENTION

Figure 1:
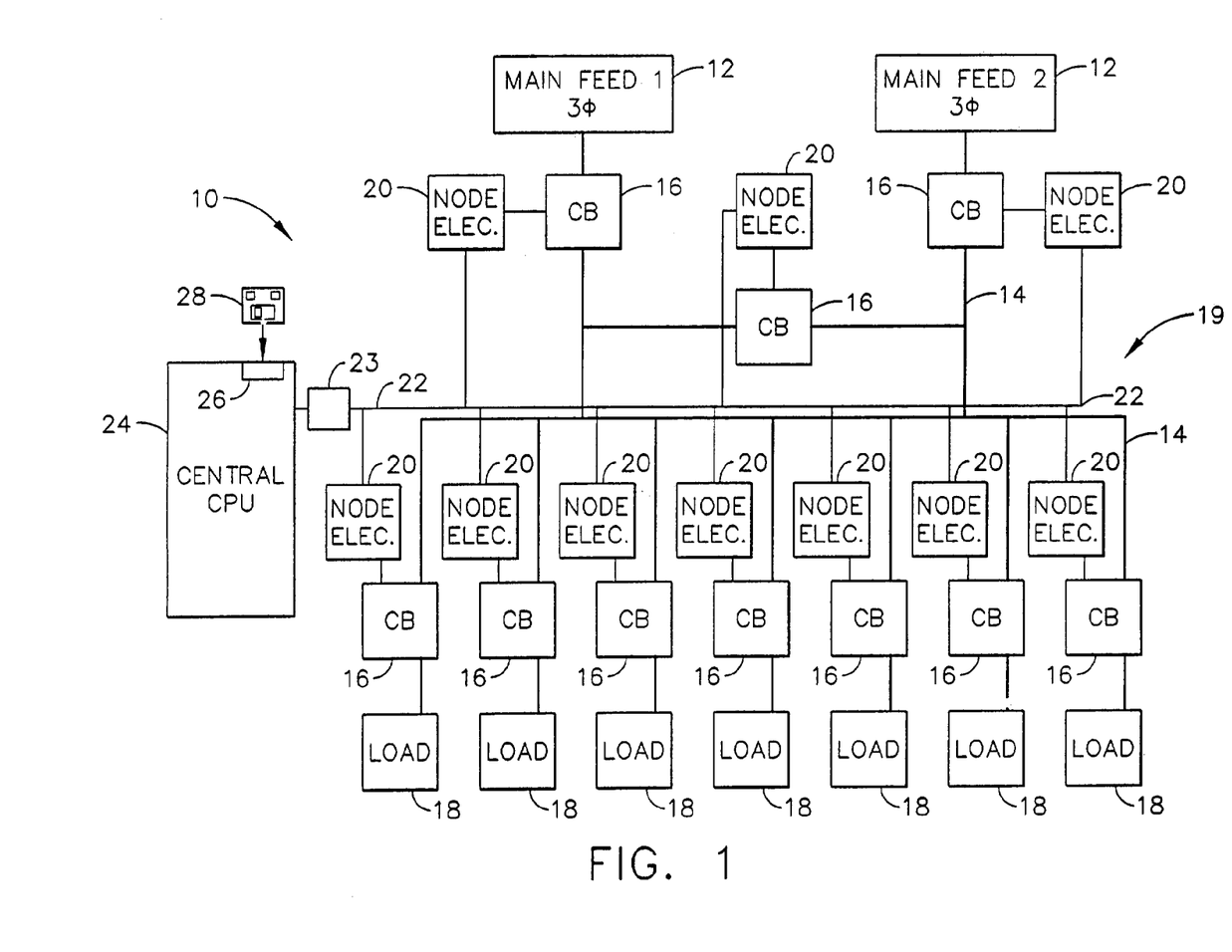
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, an electric generator driven by a prime mover locally, or an electric utility source from an electrical substation. The prime mover may be powered from, for example, but not limited to, a turbine, or an internal combustion engine. Power supplied to main feed system 12 is divided into a plurality of branch circuits by a plurality of busbars configured to route the power from a branch feed breaker and a bus-tie breaker to a plurality of load circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In one embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
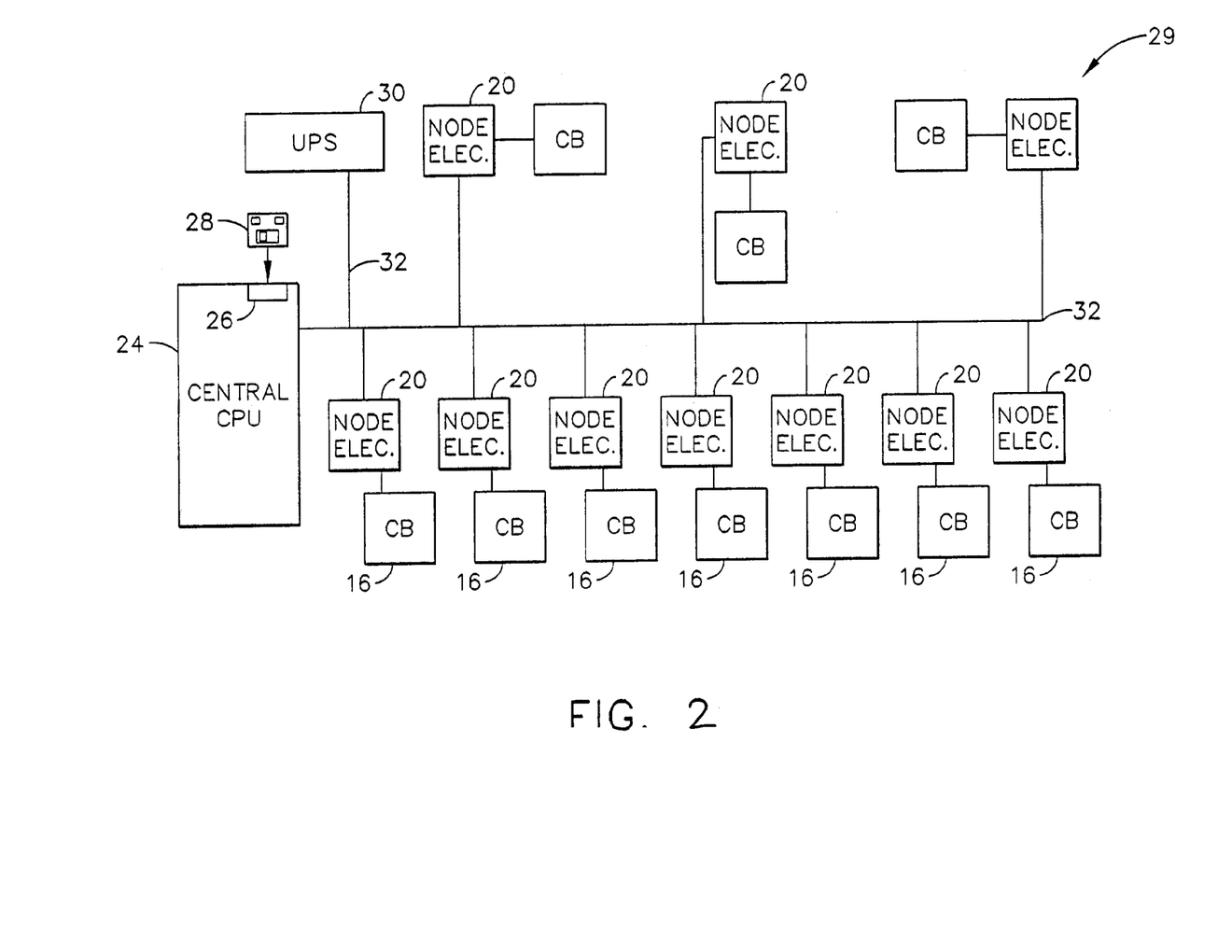
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronic units 20 through a node power distribution bus 32. In an exemplary embodiment, power source 30 is an uninterruptible power supply (UPS). In one embodiment, power source 30 receives power from power distribution system 10 and then distributes this power to node electronic units 20 through node power distribution bus 32. In an alternative embodiment, power is not supplied to power source 30, but rather, power source 30 supplies power to node electronic units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
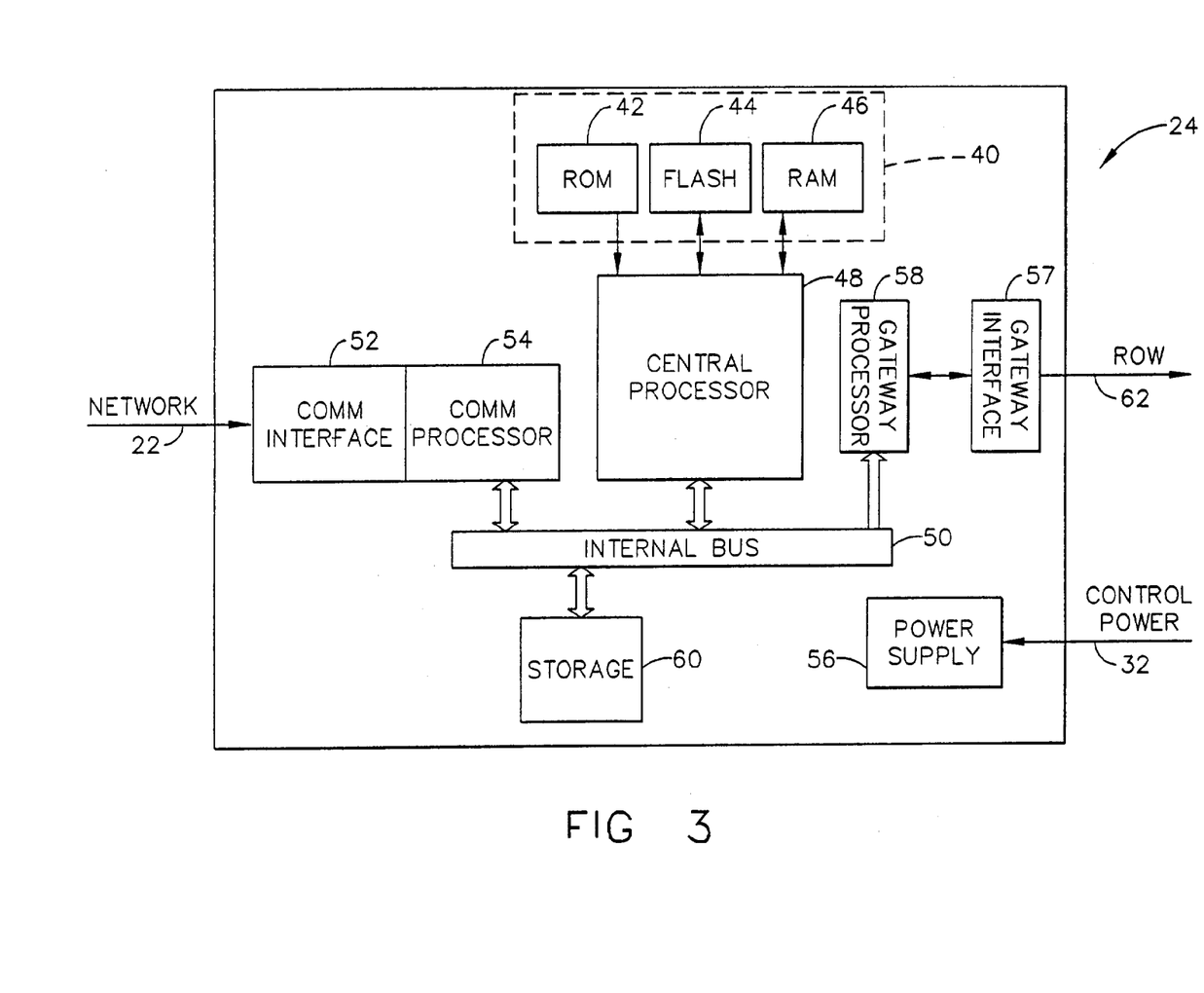
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronic unit 20 via CCPU 24 and digital network 22. In another embodiment, information sent from node electronic unit 20 is received at communication interface 52 and transmitted to Internet 62 via gateway interface 57.

Figure 4:
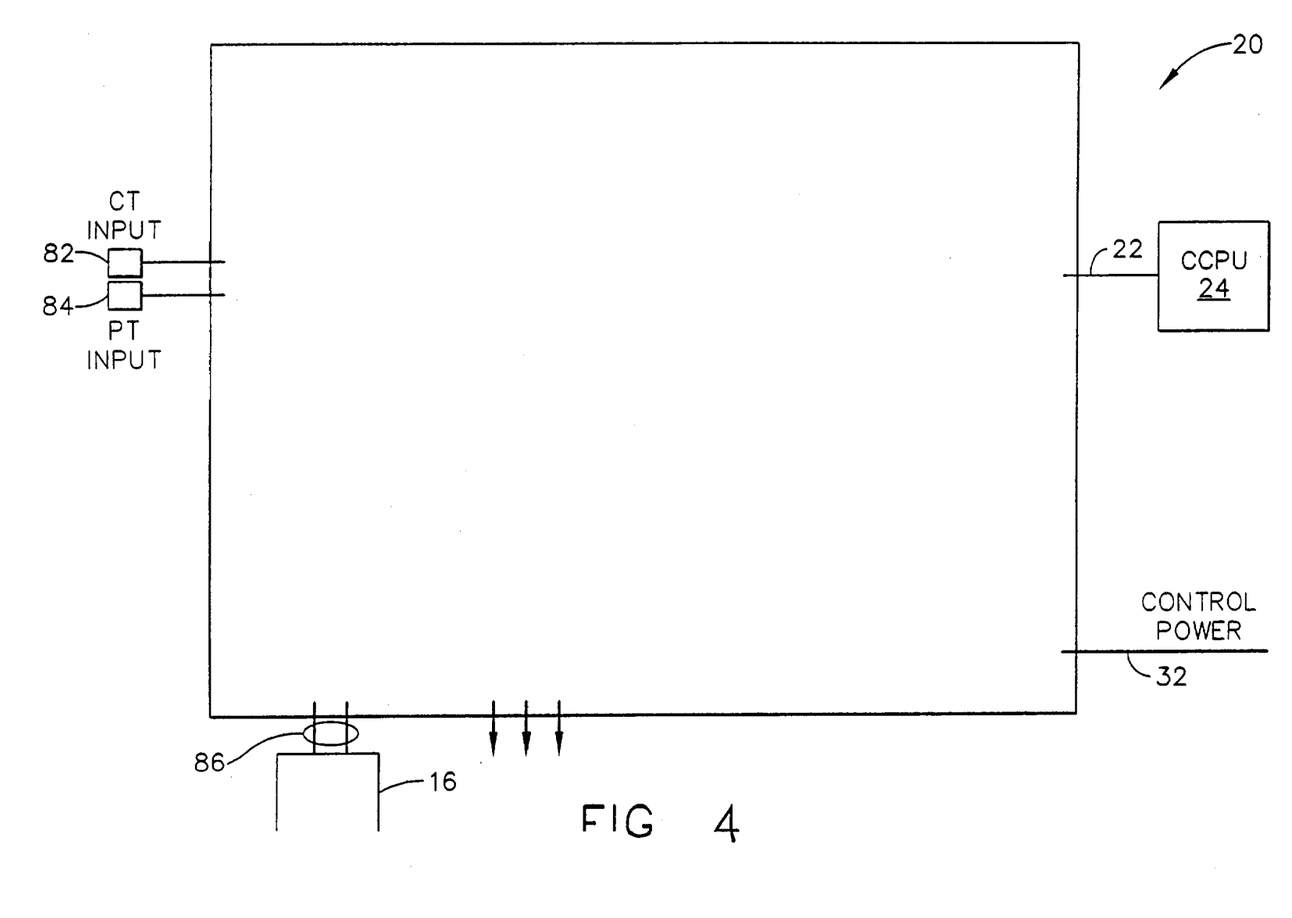
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, and a voltage sensor 84, and/or circuit breaker 16. Status input device 86 receives a plurality of status signals from circuit breaker 16 can include signals related to one or more conditions of the breaker, such as, but not limited to, an auxiliary switch status, and a spring charge switch status. Additionally, node electronics unit 20 sends signals 86 to at least circuit breaker 16 in order to control one or more states of the breaker.

In use, signals input from status input device 86, current sensor 82, and voltage sensor 84, are transmitted to CCPU 24 via node electronics unit 20, and digital network 22. Node electronics unit 20 receives the input from status input device 86, current sensor 82, and voltage sensor 84, and packages a digital message that includes the input and additional data relating to a health and status of node electronics unit 20. The health and status data may include information based on problems found by internal diagnostic routines and a status of self checking routines that run locally in node electronics unit 20. The data transmitted to CCPU 24 via node electronics unit 20 is processed by CCPU 24, which outputs a signal to node electronics unit 20 via digital network 22. In the exemplary embodiment, node electronics unit 20 actuates circuit breaker 16 in response to the signal received from CCPU 24. In one embodiment, circuit breaker 16 is actuated in response to commands sent only by CCPU 24, i.e., circuit breaker 16 is not controlled locally by node 20, but rather is operated remotely from CCPU 24 based on inputs received from current sensor 82, voltage sensor 84, and status inputs 86 received from node electronics unit 20 over network 22.

Figure 5:
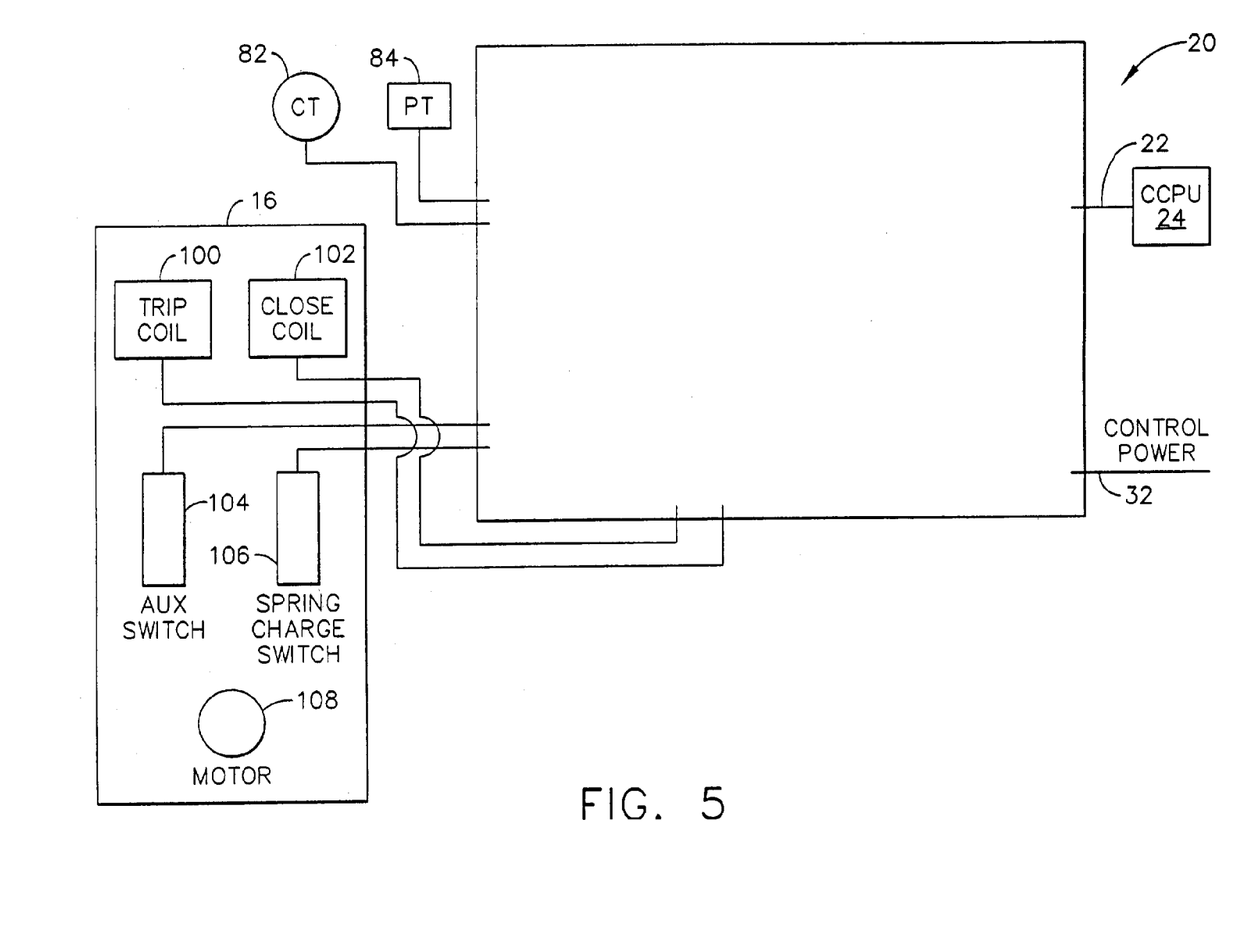
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 auxiliaries include only a trip coil 100, a close coil 102, an auxiliary switch 104, a spring charge switch 106, and a motor 108. Circuit breaker 16 does not include a trip unit. Auxiliary switches and sensors are coupled to node electronics unit 20 through a wiring harness which may include both copper wiring and communications conduits. Current sensor 82, and voltage sensor 84 are coupled to node electronics unit 20 through a cable that may include copper wiring and/or communications conduits.

Circuit breaker 16 is a unitary device mounted proximate to CCPU 20, current sensor 82, and voltage sensor 84. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84. Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and a spring charge switch 106 provide a status indication of circuit breaker parameters to node electronics unit 20. Motor 108 is configured to recharge a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
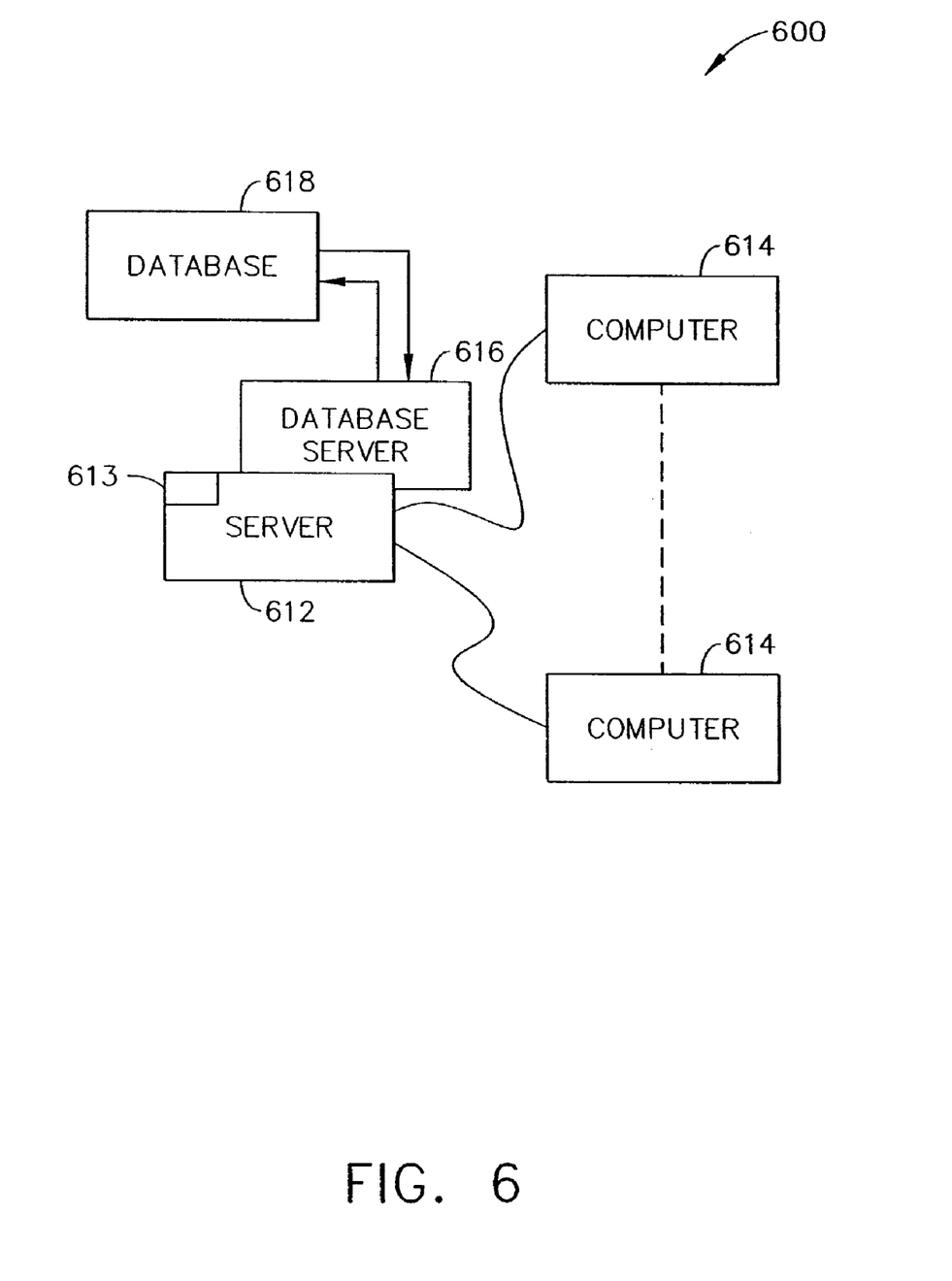
FIG. 6 is a simplified block diagram of a power distribution system design computer system that may be used with power distribution system 10 shown in FIG. 1.

FIG. 6 is a simplified block diagram of a power distribution system design computer system 600 including a server system 612 including a disk storage unit 613 for data storage, and a plurality of client sub-systems, also referred to as client systems 614, connected to server system 612. In one embodiment, client systems 614 are computers including a web browser, such that server system 612 is accessible to client systems 614 via the Internet. Client systems 614 are interconnected to the Internet through many interfaces including a network, such as a local area network (LAN) or a wide area network (WAN), dial-in-connections, cable modems and special high-speed ISDN lines. Client systems 614 could be any device capable of interconnecting to the Internet including a web-based phone, personal digital assistant (PDA), or other web-based connectable equipment. A database server 616 is connected to a database 618 containing information on a variety of matters, as described below in greater detail. In one embodiment, centralized database 618 is stored on server system 612 and can be accessed by potential users at one of client systems 614 by logging onto server system 612 through one of client systems 614. In an alternative embodiment database 618 is stored remotely from server system 612 and may be non-centralized.

Figure 7:
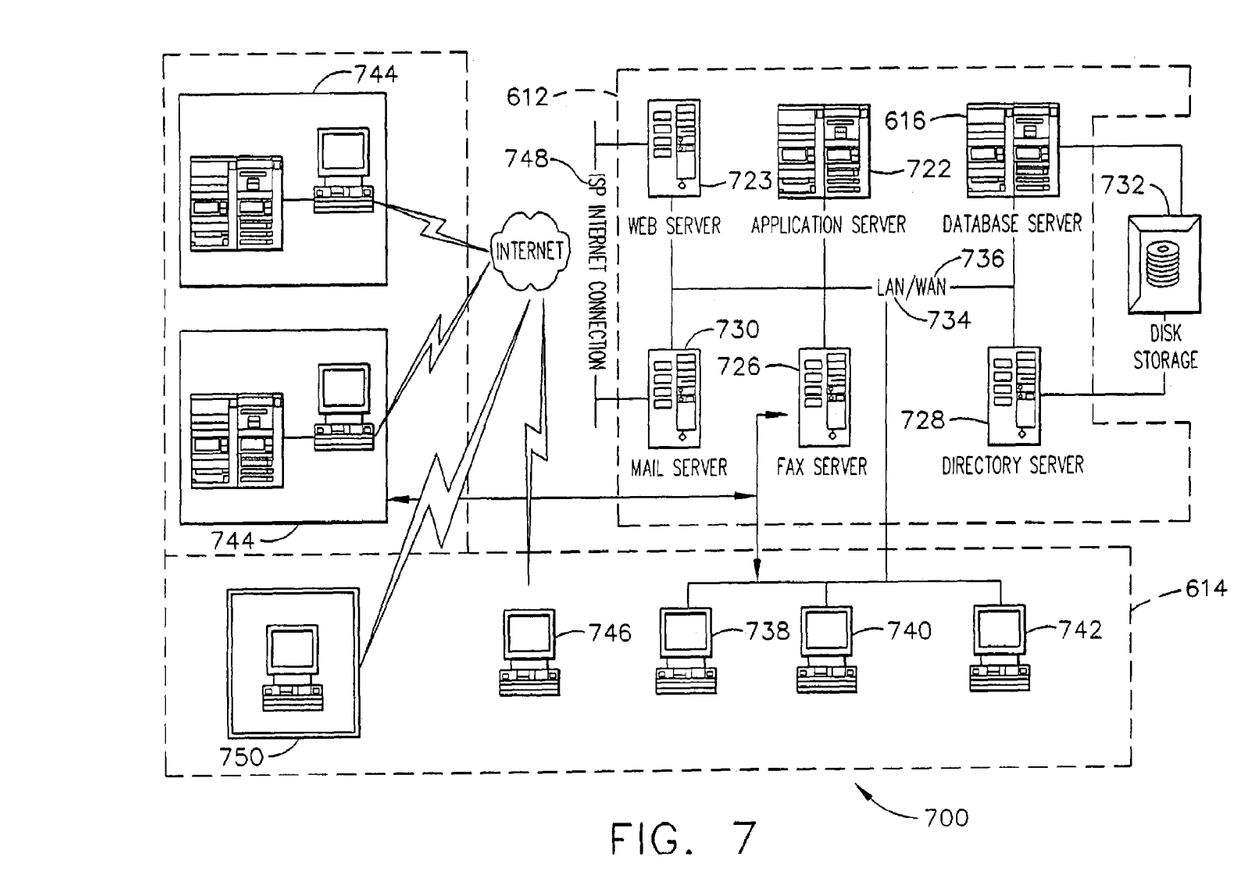
FIG. 7 is an expanded version block diagram of an exemplary embodiment of a server architecture of power distribution system design computer system shown in FIG. 6.

FIG. 7 is an expanded version block diagram 700 of an example embodiment of a server architecture of power distribution system design computer system 100 shown in FIG. 6. Components in diagram 700, identical to components of system 600 (shown in FIG. 6), are identified in FIG. 7 using the same reference numerals as used in FIG. 6. System 700 includes server system 612 and client systems 614. Server system 612 further includes database server 616, an application server 722, a web server 723, a fax server 726, a directory server 728, and a mail server 730. Disk storage unit 732 is coupled to database server 616 and directory server 728. Servers 616, 722, 723, 726, 728, and 730 are coupled in a local area network (LAN) 734. In addition, a system administrator's workstation 738, a user workstation 740, and a supervisor's workstation 742 are coupled to LAN 734. Alternatively, workstations 738, 740, and 742 are coupled to LAN 734 via an Internet link or are connected through an Intranet.

Each workstation, 738, 740, and 742 is a personal computer having a web browser. Although the functions performed at the workstations typically are illustrated as being performed at respective workstations 738, 740, and 742, such functions can be performed at one of many personal computers coupled to LAN 734. Workstations 738, 740, and 742 are illustrated as being associated with separate functions only to facilitate an understanding of the different types of functions that can be performed by individuals having access to LAN 734. In an example embodiment, client system 614 includes a workstation 750 which can be used by an internal analyst or a designated outside field engineer to review power distribution system design information relating to a system.

Server system 612 is configured to be communicatively coupled to various individuals, including employee workstation 744 and to design engineer workstation 746 via an ISP Internet connection 748. The communication in the example embodiment is illustrated as being performed via the Internet, however, any other wide area network (WAN) type communication can be utilized in other embodiments, i.e., the systems and processes are not limited to being practiced via the Internet. In addition, and rather than WAN 736, local area network 734 could be used in place of WAN 736.

In the exemplary embodiment, any authorized individual having a workstation 744 can access power distribution system design computer system 600. At least one of the client systems includes manager workstation 750 located at a remote location. Workstations 744 and 750 are personal computers having a web browser. Also, workstations 744 and 750 are configured to communicate with server system 612. Furthermore, fax server 726 communicates with remotely located client systems, including a client system 750 via a telephone link. Fax server 726 is configured to communicate with other client systems 738, 740, and 742 as well.

Figure 8:
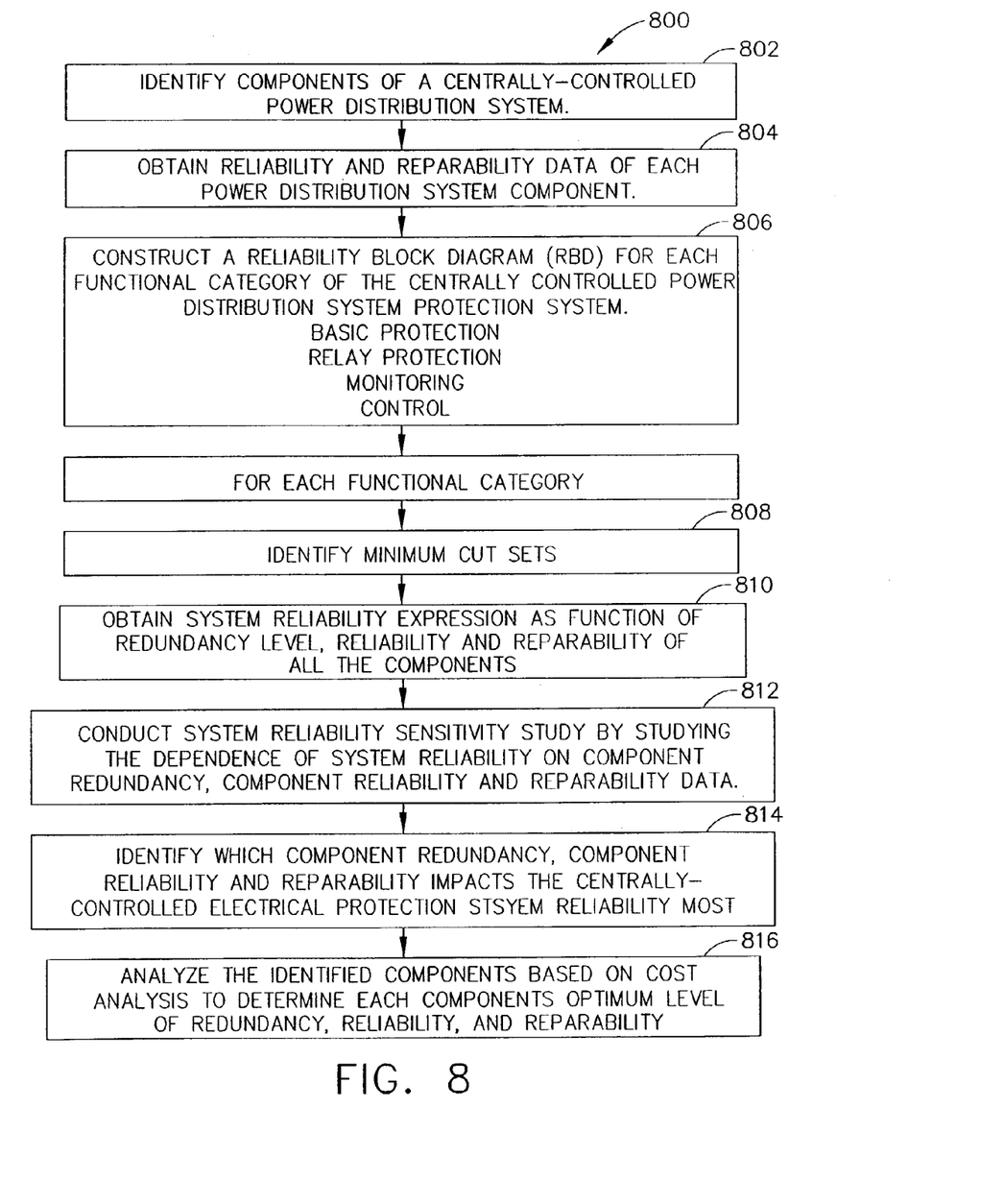
FIG. 8 is a flow chart illustrating an exemplary embodiment of a method for operating the power distribution system shown in FIG. 1.

FIG. 8 is a flow chart illustrating an exemplary method 800 for operating power distribution system 10 shown in FIG. 1. Method 800 includes an algorithm that facilitates determining a reliability characteristic and a redundancy level of each critical component in power distribution system 10. This algorithm is controlled to maximize power distribution system 10 reliability based on a redundancy level of the system components. The reliability constraint is for circuit breaker control protection system 19 to have a greater reliability than the reliability of currently available local control protection systems.

Method 800 utilizes an optimization procedure wherein a configuration of power distribution system 10 is determined based on user's requirements. A pre-determined level of redundancy for components of power distribution system 10 is selected based on the configuration and a capability to supply inputs to the system. For example, consideration would be given to selecting a redundancy level of two for a power supply, when only one power supply is available. From the determined configuration, a plurality of interconnected components of centrally-controlled power distribution system 10 are identified 802 to a software program code segment running on computer system 600. For each component identified, data relating to each component's reliability and reparability is obtained 804. A user may input component data directly to computer system 600 or the data may be acquired from a database accessible to computer system 600. In the exemplary embodiment, component data includes, for example, component reliability data expressed in empirically derived units or calculated units. For example, mean time between failures (MTBF) and mean time to repair (MTTR), parameters may be derived from statistical analysis of operational tests, a calculation of failure effects and mode analysis (FMEA), or may be looked-up in a table of previously determined data. Component data may also include a definition of component interconnection in the system, environmental factors affecting the component's operation, a circuit analysis of the proposed power distribution system 10 to bound the expected parameters to which each component may be exposed, a number and/or reliability of available power sources, a number and/or configuration of branch circuits, and a number and rating of a plurality of loads. It should be appreciated that the program code segment can, in one embodiment, be resident in a storage medium. It should further be appreciated that, in one embodiment, the storage medium can comprise a floppy disk, a CD-ROM, or a processor hard drive.

An operating system running on system 600 communicates with the user through a shell, sometimes referred to as a graphical user interface (GUI). The shell controls the manner in which information is displayed, or otherwise output to the user and allows the user to input information to computer system 600.

An application software program code segment communicates with hardware within system 600 through an operating system and software drivers and communicate with the user through the operating system and shell. In the exemplary embodiment, a Visual Basic™ (VB) script is used for programming operations of method 800 within an application program, such as, for example, Excel™. Visual Basic for Applications™ (VBA), for example, allows programming within an application over a wide assortment of applications. A user may use this program to automate steps, such as automatically filling in cells of a spreadsheet responsive to inputs on a custom dialog box.

A protection scheme of power distribution system 10 includes a plurality of functional categories, such as, for example but, not limited to, a basic protection category, a relay protection category, a monitoring category and a control category. A Reliability Block Diagram (RBD) is constructed 806 for each category of protection system based on the components and the component data.

For each RBD, a minimum cut set is identified 808 and a system reliability expression as a function of redundancy level, reliability and reparability of all components is determined 810. A component reliability is determined empirically, by calculation, or from known historical data accessible to computer system 600. Each component's reliability may have an effect on the overall system reliability, the initial system configuration, and the level of redundancy of each component needed to achieve the user's system reliability goal. Once the reliability of each component has been determined, a reliability of system 10 is determined 810. In the exemplary embodiment, the reliability of system 10 is determined 810 using a reliability block diagram technique wherein redundant components reliability is calculated as parallel reliability blocks. The reliability block diagram is built based on a redundancy configuration determined for system 10. A sensitivity study is then conducted 812 to determine a dependence of the reliability of power distribution system 10 on each components redundancy, reliability and reparability. The program code segment is configured to vary the redundancy of each component, vary the reliability of each component, and vary the reparability of each component and produce an output which is monitored to determine a value representing the amount by each component redundancy, reliability, and reparability modifies the reliability of system 10. The process is iterative in that after each determination of the system reliability, the program code segment varies the redundancy, reliability, and reparability of the components in system 10 in a predetermined order to determine the next modification of system 10 reliability. The process is repeated until a predetermined reliability goal is achieved. From the results of the analysis, the components may be ordered according to each component's redundancy, reliability, and reparability impact to power distribution system 10 reliability and the component characteristics and configuration that impacts the reliability of power distribution system 10 the most may be identified 814. Components whose redundancy, reliability, and reparability have the greatest impact to the reliability of system 10 may then be analyzed 816 based on cost data to determine an optimal level of redundancy, reliability, and reparability. A combination of the sensitivity study with a cost study that takes into account, for example, manufacturing resources, labor resources and material procurement resources, may be used to determine an optimum solution to an overall system reliability. For example, it may be determined that simply making a component redundant is more cost effective than increasing the individual component's reliability. Additionally, for example, it may be found in a particular case that it is more cost-effective to make a component easier to repair or replace than to make it redundant or more reliable.

The above-described power distribution system computer systems are cost-effective and highly reliable. Each computer system includes a server system including a disk storage unit for data storage, and a plurality of client sub-systems connected to the server system. The power distribution system includes a central control unit and networked devices to facilitate protecting a set of switchgear. The components of the power distribution system are coupled redundantly to form a highly reliable system. To facilitate determining a cost-effective level of redundancy, the computer system analyzes the reliability of each component and the interconnection of the components to determine which component's redundancy affects the power distribution system reliability the greatest amount. This method offers performance advantages over existing local, non-networked protection design systems. Additionally the system components and configuration are facilitated to be optimized to provide high reliability and high availability. Accordingly, the power distribution system computer system facilitates protection and optimization of power system operation in a cost-effective and reliable manner.

Exemplary embodiments of power distribution system computer system components are described above in detail. The components are not limited to the specific embodiments described herein, but rather, components of each system may be utilized independently and separately from other components described herein. Each power distribution system computer system component can also be used in combination with other power distribution system components.

While the invention has been described in terms of various specific embodiments, those skilled in the art will recognize that the invention can be practiced with modification within the spirit and scope of the claims.

What is claimed is:

1. A method for improving reliability of a centrally-controlled power distribution system architecture based on sensitivity analysis wherein the power distribution system includes at least one component, and a protection system that includes at least one functional category, said method comprising:

identifying at least one component of the centrally-controlled power distribution system;

obtaining at least one of reliability data and reparability data for each at least one component of the centrally-controlled power distribution system; and constructing a reliability block diagram for each functional category, wherein constructing a reliability block diagram for each functional category comprises constructing a reliability block diagram for categories including at least one of a basic protection function, a relay protection function, a monitoring function, and a control function.

2. A method in accordance with claim 1 further comprising determining a reliability of each component in the system wherein the reliability is measured as a probability of the component functionality at a first time that is greater than or equal to the system functionality at a second time wherein the first time is later than the second time.

3. A method for improving reliability of a centrally-controlled power distribution system architecture based on sensitivity analysis wherein the power distribution system includes at least one component, and a protection system that includes at least one functional category, said method comprising:

identifying at least one component of the centrally-controlled power distribution system;

obtaining at least one of reliability data and reparability data for each at least one component of the centrally-controlled power distribution system; and     constructing a reliability block diagram for each functional category,     further comprising, for each functional category, performing the following steps iteratively:

identifying a minimum cut set;

determining a reliability of the centrally-controlled electrical protection system;

varying at least one of a redundancy, a reliability, and a reparability of each of the at least one component of the system; and     determining a change in the system reliability based on a change of the redundancy, reliability, and reparability of each of the at least one component.

4. A method in accordance with claim 3 wherein determining a reliability of the centrally-controlled electrical protection system comprises determining the reliability of the centrally-controlled electrical protection system based on the at least one of the level of redundancy of each component, the reliability of each component, and the reparability of each component.

5. A method in for improving reliability of a centrally-controlled power distribution system architecture based on sensitivity analysis wherein the power distribution system includes at least one component, and a protection system that includes at least one functional category, said method comprising:

identifying at least one component of the centrally-controlled power distribution system;

obtaining at least one of reliability data and reparability data for each at least one component of the centrally-controlled power distribution system; and     constructing a reliability block diagram for each functional category further comprising, for each functional category:

identifying a first component whose change in at least one of redundancy, reliability and reparability produces a change of the system reliability of a first amount; and     identifying a second component whose change in redundancy, reliability, and reparability produces a change of the system reliability of a second amount, wherein said first amount is greater than the second amount.

6. A method for improving reliability of a centrally-controlled power distribution system architecture based on sensitivity analysis wherein the power distribution system includes at least one component, and a protection system that includes at least one functional category, said method comprising:

identifying at least one component of the centrally-controlled power distribution system;

obtaining at least one of reliability data and reparability data for each at least one component of the centrally-controlled power distribution system;

constructing a reliability block diagram for each functional category; and     ordering the at least one components based on the relative amount of change of system reliability associated with each change of each component redundancy, reliability, and reparability.

7. A method in accordance with claim 6 further comprising analyzing the ordered components using cost analysis to determine each component optimum level of redundancy, reliability, and reparability.

8. A computer system for improving reliability of a centrally-controlled electrical protection system architecture based on sensitivity analysis wherein said centrally-controlled electrical protection system comprises at least one component, said computer system configured to:

determine a reliability of said centrally-controlled electrical protection system;

vary at least one of a redundancy, reliability, and a reparability of said at least one component of said system;

determine a change in said system reliability based on a change of said varied redundancy, reliability, and reparability of each said at least one component;

identify a first component whose change in at least one of redundancy, reliability and reparability produces a change of the system reliability of a first amount; and     identify a second component whose change in redundancy, reliability, and reparability produces a change of the system reliability of a second amount, wherein said first amount is greater than the second amount.

9. A computer system in accordance with claim 8 wherein said computer system is further configured to identify at least one component included in said system.

10. A computer system in accordance with claim 8 wherein said computer system is further configured to determine a reliability of each component in said system wherein said reliability is measured as a probability of said component functionality at a first time that is greater than or equal to said component functionality at a second time wherein said first time is later than said second time.

11. A computer system in accordance with claim 8 wherein said computer system is further configured to determine a reliability of said centrally-controlled electrical protection system based on at least one of said determined reliability of each component, said reparability of each component, and said redundancy of each component.

12. A computer system in accordance with claim 8 wherein said computer system is further configured to iteratively determine a change in said determined system reliability for each change in each component redundancy, reliability, and reparability wherein said change in said determined system reliability is expressed as an amount of change relative to said first amount.

13. A computer system in accordance with claim 12 wherein said computer system is further configured to order said at least one components based on said relative amount of change of system reliability associated with each change of each component redundancy.

14. A computer system in accordance with claim 8 wherein said computer system is further configured to select said component whose change in redundancy affects a change in system reliability by said greatest amount.

15. A program code segment embodied on a computer-readable medium for improving reliability of a centrally-controlled electrical protection system architecture based on sensitivity analysis wherein said centrally-controlled electrical protection system comprises at least one component, said program code segment configured to:

determine a reliability of said centrally-controlled electrical protection system;

vary at least one of a redundancy, a reliability, and a reparability of said at least one component of said system;

determine a change in said system reliability based on a change of said varied redundancy, reliability, and reparability of each said at least one component;

identify a first component whose change in at least one of redundancy, reliability and reparability produces a change of the system reliability of a first amount; and identify a second component whose change in redundancy, reliability, and reparability produces a change of the system reliability of a second amount, wherein said first amount is greater than the second amount, wherein the program code is resident on a storage medium.

16. A program code segment in accordance with claim 15 wherein said program code segment is further configured to identify at least one component included in said system.

17. A program code segment in accordance with claim 15 wherein said program code segment is further configured to determine a reliability of each component in said system wherein said reliability is measured as a probability of said component functionality at a first time that is greater than or equal to said component functionality at a second time wherein said first time is later than said second time.

18. A program code segment in accordance with claim 15 wherein said program code segment is further configured to determine a reliability of said centrally-controlled electrical protection system based on said determined reliability of each component and a redundancy of each component.

19. A program code segment in accordance with claim 15 wherein said program code segment is further configured to iteratively determine a change in said determined system reliability for each change in each component redundancy wherein said change in said determined system reliability is expressed as an amount of change relative to said first amount.

20. A program code segment in accordance with claim 19 wherein said program code segment is further configured to order said at least one components based on said relative amount of change of system reliability associated with each change of each component redundancy.

21. A program code segment in accordance with claim 15 wherein said program code segment is further configured to select said component whose change in redundancy affects a change in system reliability by said greatest amount.

22. A program code segment in accordance with claim 15 wherein the computer-readable medium is a floppy disk, a CD-ROM, or a processor hard drive.

* * * * *